United States Patent [19]

Chevereau et al.

[11] Patent Number: 5,000,907
[45] Date of Patent: Mar. 19, 1991

[54] NUCLEAR REACTOR WITH EMERGENCY COOLING WATER INJECTION DEVICE

[75] Inventors: Gerard Chevereau, La Raincy; Claude Cauquelin, Neauphle Le Chateau; Claude Falduti, St Michel sur Orge, all of France

[73] Assignee: Framatome, Courbevoie, France

[21] Appl. No.: 350,438

[22] Filed: May 11, 1989

[30] Foreign Application Priority Data

May 13, 1988 [FR] France ............................... 88 06475

[51] Int. Cl.$^5$ .............................................. G21C 15/18
[52] U.S. Cl. .................................................... 376/282
[58] Field of Search ........................ 376/282, 352, 289

[56] References Cited

U.S. PATENT DOCUMENTS

| 3,528,884 | 9/1970 | Collier et al. | 376/282 |
| 3,976,834 | 8/1976 | Bevilacqua | 376/282 |
| 3,981,770 | 9/1976 | Middleton | 376/282 |
| 4,072,560 | 2/1978 | Seidelberger | 376/282 |
| 4,078,966 | 3/1978 | Verdeau | 376/282 |
| 4,187,147 | 2/1980 | Braun et al. | 376/282 |
| 4,643,871 | 2/1987 | Fajeau | 376/282 |
| 4,842,813 | 6/1989 | Desfontaines et al. | 376/282 |

Primary Examiner—Daniel D. Wasil
Attorney, Agent, or Firm—Pollock, Vande Sande & Priddy

[57] ABSTRACT

A nuclear reactor is provided with an emergency cooling water injection device, comprising a vessel through which pass not only the cooling water inlet and outlet pipes under normal operating conditions but also a conduit for injecting pressurized water coming by an emergency reservoir, should a breakage of the primary circuit occur. A thermally insulated duct of the side wall of the vessel, at least at the level of the core, conveys the injected water below the core support plate.

9 Claims, 2 Drawing Sheets

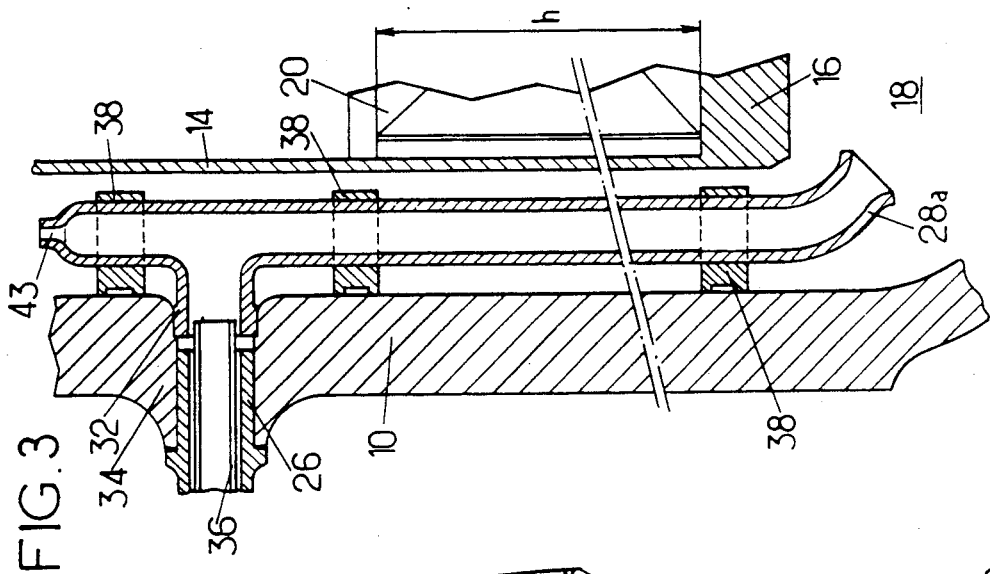
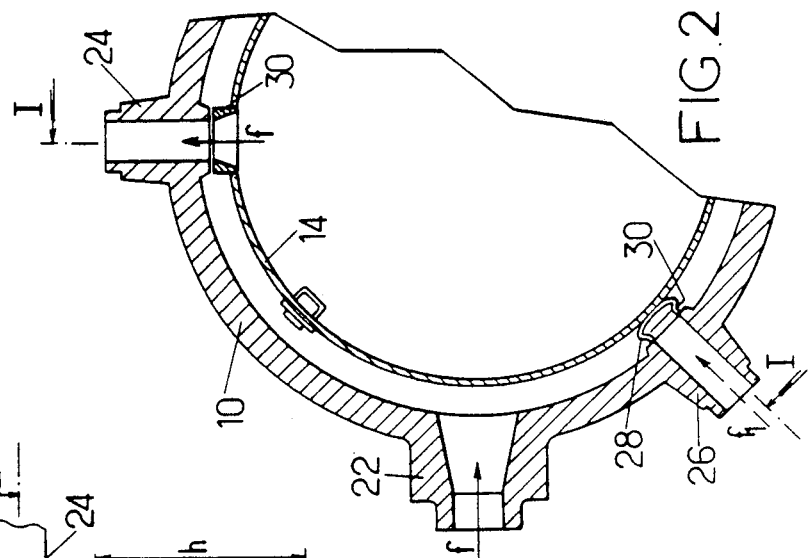
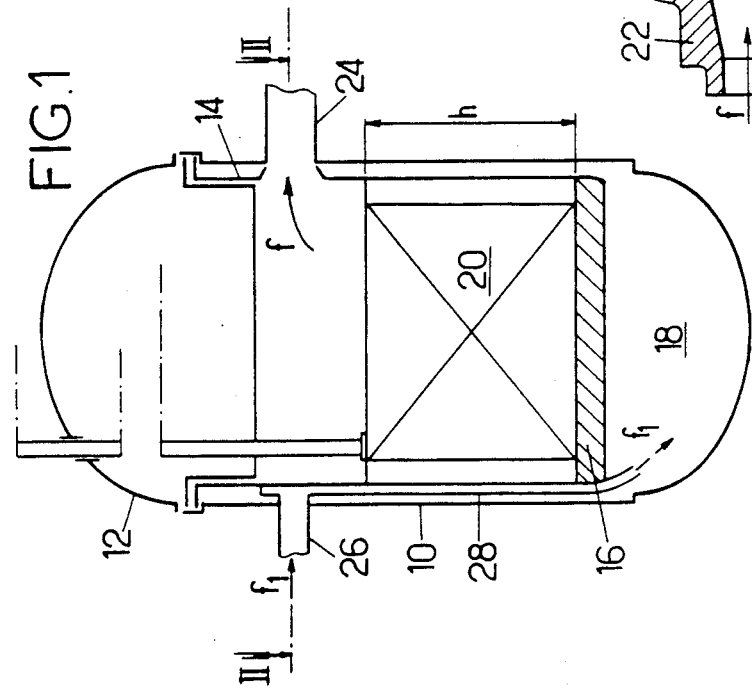

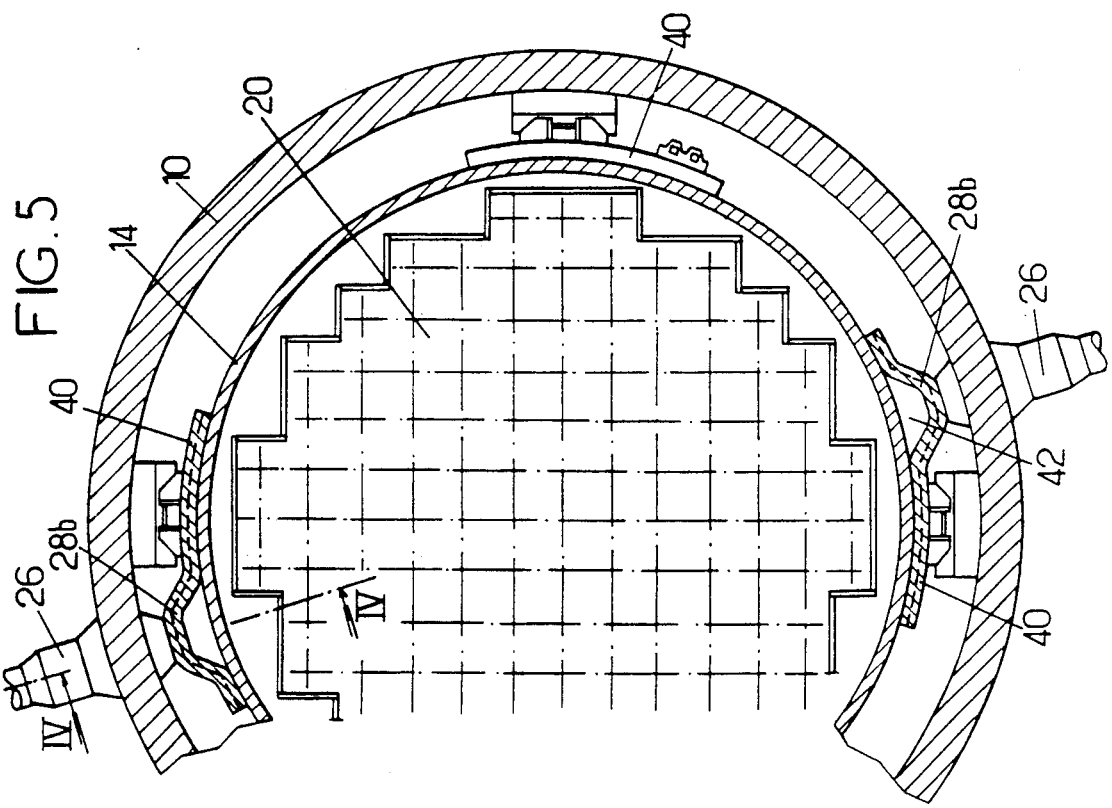
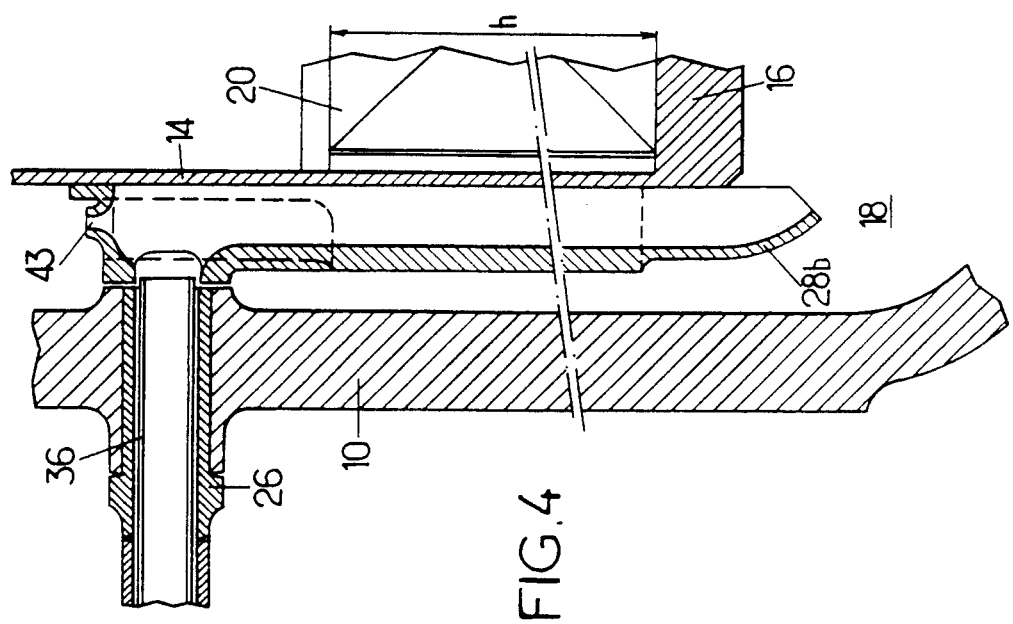

NUCLEAR REACTOR WITH EMERGENCY COOLING WATER INJECTION DEVICE

BACKGROUND OF THE INVENTION

The present invention relates to pressurized water nuclear reactors having a water injection device for delivering a flow of emergency water stored in an external reservoir to the reactor vessel for temporarily compensating the egress of water upon failure of a pipe in the primary cooling circuit.

PRIOR ART

Reactors provided with such injection devices (FR-A-1 597 057) have been known for long. One of the defects of most prior art devices is that injection of cold emergency water, stored at atmospheric pressure in an external reservoir, causes a thermal shock when it enters the reactor vessel at a high operating temperature. This particularly detrimentally affects the portion of the ring of the vessel situated at the horizontal level of the core for, due to the high level of irradiation received by this portion, its mechanical characteristics may have decreased. It is necessary that the vessel resists the residual internal pressure upon a rupture of the primary circuit and occurrence of emergency injection. In present day reactors, attempts have been made to solve the problem by injecting water at one or more locations of the circuit which are as remote as possible from the vessel wall, so that the cold water mixes with hot water still present in the circuit before it contacts the side wall of the vessel.

Another pressurized water nuclear reactor has been proposed in FR-A-2 314 919, which comprises a vessel which is closed by a cover, has cooling water input and output nozzles, and is connected to at least one conduit for the injection of pressurized water from an emergency reservoir; the duct opens into the vessel at the same level as or above the level of all nozzles; the reactor further comprises internals suspended from the vessel, having a core support plate and forming with the side wall of the vessel an annular downward water flow passage from the input or each inlet nozzle to a distribution space situated below the core support plate; a duct extending the conduit downward is located within the dividing structure (baffles and formers) of the internals equipment.

In such a reactor, the injection function of the conduit is secondary: its main purpose is to reintroduce water delivered by a water recirculation circuit connected to the outlet nozzle. The duct is used for emergency injection based on the natural idea that, since the duct plays its function only during normal operation of the reactor, it is available for emergency injection should an accident occur. However, since the duct opens above the core support plate, the water reaches the fuel assemblies before it is appreciably heated, and may damage the fuel assemblies and particularly causes fuel rod sheath failure.

A nuclear reactor is also known having conduits passing through the vessel and used solely for injecting emergency cooling water, whose output into the vessel has deflectors for directing the jet of incoming water toward the bottom of the vessel (FR-A-2 286 478). This solution does not overcome the thermal shock problem on the side ring of the vessel. On the contrary, it may be enhanced since the deflectors direct the stream of cold water along the vessel, directly toward the most sensitive portion thereof.

SUMMARY OF THE INVENTION

It is an object of the present invention to provide a nuclear reactor of the above-defined type which simultaneously allows injection of emergency cooling water directly into the vessel, consequently achieving maximum efficiency, and avoids causing a thermal shock on sensitive parts, such as the side ring of the vessel at the horizontal level of the core and the fuel assemblies.

To this end, there is provided a reactor in which the duct is isolated thermally from the side wall of the vessel, at least at the same horizontal level as the core, and opens in the distribution space below the core support plate where the temperature of the cold water injected is rapidly increased by mixing with a large amount of water.

In a particular embodiment, each duct is fixed rigidly to a casing belonging to the internal equipment and comprises end sealing means for substantially watertight contact abutment against an outlet of the corresponding conduit; in a modification, each duct is fixed to the side wall of the vessel by means which hold it at a distance therefrom.

The invention will be better understood from the following description of particular embodiments, given by way of non-limiting examples. The description refers to the accompanying drawings.

BRIEF DESCRIPTION OF THE DRAWINGS

FIG. 1 shows very schematically a first embodiment of a pressurized water reactor according to the invention, in cross-section through line I—I of FIG. 2;

FIG. 2 is a horizontal section through line II—II of FIG. 1, showing a possible distribution of the pipes and of the injection ducts;

FIG. 3 is an enlarged detail view showing an injection conduit and the corresponding duct of a reactor according to a modified embodiment, in cross-section through a vertical plane;

FIG. 4, similar to FIG. 3, shows a modification, in a section through line IV—IV of FIG. 5;

FIG. 5 is a horizontal sectional view of the reactor of FIG. 4, at the level of the pipes.

DETAILED DESCRIPTION OF PREFERRED EMBODIMENTS

The pressurized water nuclear reactor shown schematically in FIG. 1 is of generally conventional construction. It comprises a pressure vessel 10 sealingly closed by a cover 12. On a shoulder of vessel 10 rests a flange of a casing 14 belonging to the internals of the reactor. A core support plate 16 is fixed to the casing 14 and defines, with the bottom of the vessel, a distribution space 18. Core 20 is supported by plate 16 and is formed of juxtaposed upstanding fuel assemblies over a height h. The vessel is provided with inlet nozzles 22 and outlet nozzles 24 for the pressurized water forming the coolant and the moderator of the reactor; four nozzles are provided in the reactor as shown. In normal operation, pressurized water arrives through the inlet nozzles 22, flows down toward the distribution space 18 through the annular passage defined by the side ring of the vessel 10 and by casing 14, flows up through openings in the core support plate 16 and through the core 20 to a plenum, and escapes through nozzles 24. It follows the path shown by arrows f in FIGS. 1 and 2.

According to an aspect of the invention, the reactor is provided with means for injecting emergency cooling pressurized water, comprising a conduit 26 fed by an emergency installation which may have any one of many usual constructions and a duct 28 which receives the water delivered by conduit 26 and conveys it to a location below the core support plate 16. With that arrangement the cold water injected upon of failure of the primary cooling circuit (LOCA) mixes with residual hot water in space 18 before it cools the core through which it flows due to natural convection, after it has passed through openings (not shown) in the core support plate.

As shown, the outlets of conduits 26 must be at the same level as that of nozzles 22 and 24 or above them. A siphon-breaker, formed by a calibrated orifice 43 at the top part of each duct 28 should also be at the same or above the level of the nozzles, so as not to aggravate the risks of inflating the core 20 should a pipe break in the emergency water injection circuit. The latter will not be described, for it may have any one of the known constructions, for example that described in French No. 1 597 057 already mentioned. As shown in FIG. 2, the reactor comprises two ducts 28, each placed midway between an inlet nozzle 22 and an outlet nozzle 24. The ducts may have a circular, trapezoidal or other cross-section instead of the elliptic cross-section as shown.

Each duct 28 is fixed to the core casing 14 at intervals sufficiently short for avoiding that the ducts be torn away or deformed by the turbulences created by the water flow during normal operation or during emergency water injection. Since the ducts 28 are fixed to the core casing 14, they are removed at the same time as the lower internals and leaves free access to the whole internal surface of the vessel for the periodic inspection required between operating cycles of the reactor. A radial gap is provided between each duct 28 and the wall of the vessel. The gap separating the duct from the vessel forms a heat insulating cushion protecting the vessel against thermal shocks which the injection of cold water would otherwise cause due to direct contact with the vessel throughout its length. The insulation by the water sheet (or eventually steam in the case of a malfunction) several centimeters thick at an intermediate temperature is sufficient to protect the vessel over the critical height h.

In addition, duct 18 itself provides heat insulation because it will be generally formed from austenitic stainless steel whose heat conductivity is less than that of the steel of the vessel.

The connection between the outlet of each conduit 26 and the corresponding duct 28 may be provided by means similar to those used for forming a substantially water-tight connection between the outlet nozzles 24 and the water outlet openings formed through casing 14; the casing is provided with sleeves 30 confronting delivery nozzles 24 and conduits 26. When the reactor is cold, a radial clearance exists between sleeve 30 and the vessel. When the reactor reaches its operating temperature, the differences of thermal expansion coefficient between the metal forming the vesel and that forming the casing bring sleeve 30 in contact. The sealing may be uncomplete because of manufacturing tolerances. But the fraction of the flow injected which may escape through the clearance will always remain low and insufficient to cause a cold shock on the vessel.

In the embodiment of the invention shown in FIG. 3, ducts 28a are fixed to the side wall of the vessel instead of being fixed to casing 14. This arrangement has the advantage of providing more room than the FIGS. 1 and 2 of reducing the leaks. Sealing may be provided by engaging a connector 32, secured to duct 28, into pipe 34 which receives conduit 26. A thermal protection sleeve 36 maY be provided for limiting the thermal gradient through the vessel. A similar sleeve may be provided in the embodiment shown in FIGS. 1 and 2.

To insulate each duct 28a thermally from the wall of vessel 10 over height h, the supports 38 are placed as much as possible outside this zone. The extent of the contact area between supports 38 and the vessel is as reduced as possible whereas, on the other hand, the contact area between the supports and the fluid which surrounds them (water or steam) is as high as possible. To make complete inspection of the vessel possible, it is preferable to fix the supports to the vessel by remotely removable members.

In some reactors, it is necessary to protect the vessel portions which are closest to the core by neutron absorbing screens called "thermal screens". FIG. 5 shows for example a reactor in which, because of the polygonal shape of the core, four regions of vessel 10 are particularly exposed to the neutron flow. In these four regions, thermal screens 40, generally formed of steel plates, are disposed against the core casing 14, separated from the core properly speaking by a dividing wall (not shown).

In such a reactor, the emergency water injection ducts 28 are typically integral with some of the thermal screens 40. For that, the form of one or several screens 40 is locally modified so as to provide a water injection space 42 between them and the casing 14. For that purpose the screens are extended upward and downward, at least over a portion of their angular development. As shown in FIG. 4, the screens may have a smaller thickness where they simply form an injection duct 28 than where they also fulfil a neutron protection function, over height h.

Numerous other embodiments of the invention are possible. Even when no thermal screen is necessary, the ducts may be formed by a metal sheet bent into a U-shape with divergent legs or in the shape of an omega as shown in FIGS. 4 and 5. The lower parts of the ducts may have a shape dispersing the injected cold water, for example in the form of a fish tail.

We claim:

1. Pressurized water nuclear reactor comprising :
   a vessel closed by a cover, having cooling water inlet and outlet nozzles
   at least one conduit for injecting pressurized water coming from an emergency reservoir, opening into the vessel at the same level as at or above the level of said nozzles;
   internals suspended from the vessel, having a plate supporting a reactor core and forming, with the side wall of the vessel, an annular downward water flow passage from the inlet nozzle to a distribution space below the core support plate; and
   a duct extending the conduit downwards, thermally insulated from a side wall of the vessel, at least over the height of the core, and opening into the distribution space below the core support plate.

2. Reactor according to claim 1, wherein said duct is rigidly fixed to a casing belonging to the internals and comprises substantially water-tight end means for abutting connection with an outlet of the respective conduit.

3. Reactor according to claim 1, wherein said duct is fixed to the side wall of the vessel by means which hold it at a distance therefrom, and comprises a connecting section engaged in an inlet nozzle of the respective conduit.

4. Reactor according to claim 3, wherein said duct is fixed to the vessel by support means distributed at intervals and situated above or under the core.

5. Reactor according to claim 1, wherein said duct is integral with a core thermal screen.

6. Reactor according to claim 1, wherein said conduit is provided with a thermal protection sleeve in a part thereof projecting through a side wall of the vessel.

7. Pressurized water nuclear reactor comprising :
- a vessel closed by a cover, having cooling water inlet and outlet nozzles
- at least one conduit for injecting pressurized water coming from an emergency reservoir, opening into the vessel at the same level as at or above the level of said nozzles;
- internals suspended from the vessel, having a plate supporting a reactor core and forming, with the side wall of the vessel an annular downward water flow passage from the inlet nozzle to a distribution space below the core support plate; and
- a duct extending the conduit downwards, thermally insulated from a side wall of the vessel, at least over the height of the core, and opening, into the distribution space below the core support plate located within said downward water flow passage at a distance from the lateral wall of the vessel.

8. Reactor according to claim 7, wherein said duct is connected at intervals to a casing belonging to the internals and defining said downward coolant flow passage and extends upwardly of the conduit to an end portion formed with a calibrated orifice.

9. Reactor according to claim 7 having a plurality of said ducts each located midway between respective ones of said inlet and outlet nozzles and connected to a respective conduit.

* * * * *